Feb. 11, 1958 D. D. MacLAREN 2,822,888
METHOD OF SEPARATING HYDROGEN FROM HYDROGEN-CONTAINING GASES
Filed April 15, 1955
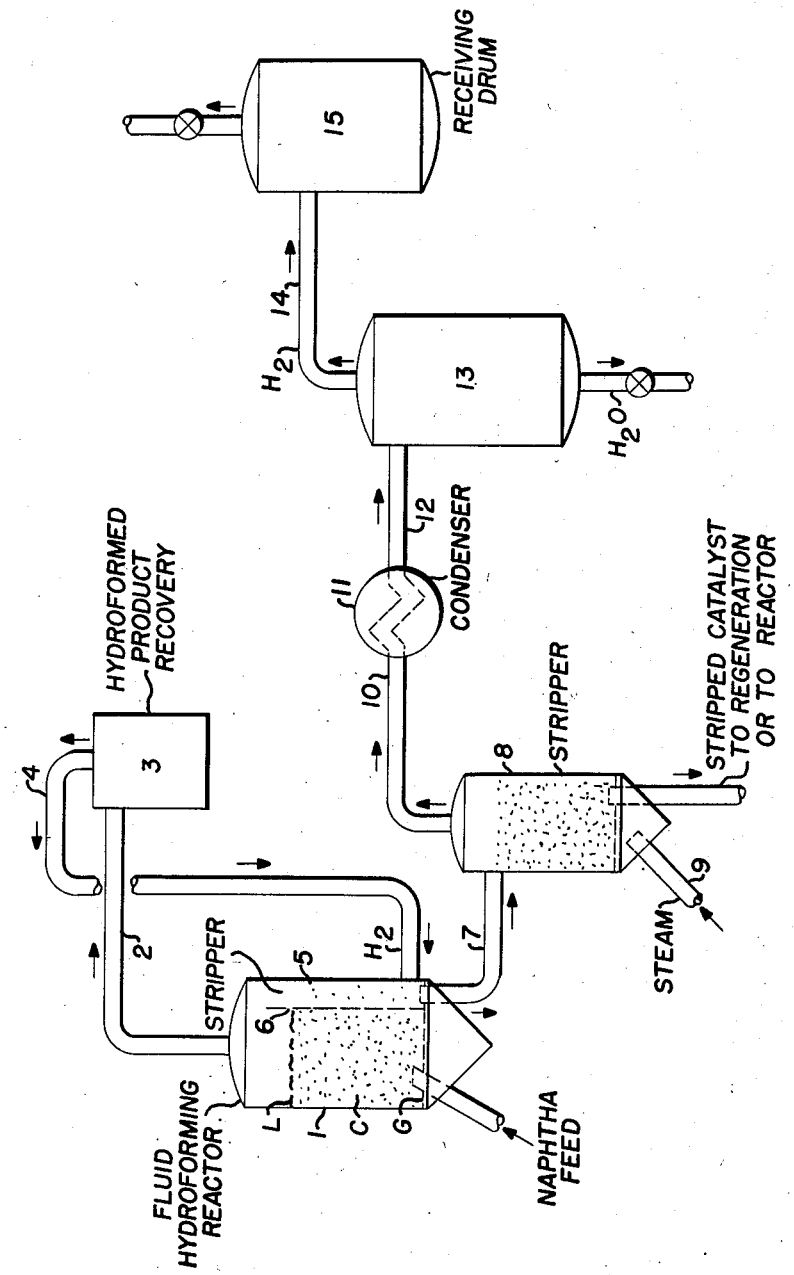
Donald D. MacLaren  Inventor
By J. Cashman Attorney

United States Patent Office 2,822,888
Patented Feb. 11, 1958

2,822,888

METHOD OF SEPARATING HYDROGEN FROM HYDROGEN-CONTAINING GASES

Donald D. MacLaren, Scotch Plains, N. J., assignor to Esso Research and Engineering Company, a corporation of Delaware Application April 15, 1955, Serial No. 501,502

9 Claims. (Cl. 183—114.2)

The present invention relates to improved methods of obtaining a hydrogen-containing gas of high purity from a mixture of hydrocarbon gases containing hydrogen in low concentration.

The use of $H_2$ in oil refineries is coming into greater and more extended use. For example, it can be used to upgrade by hydrogenation reduced crudes to more valuable products. Hydrogenation in the past has not been economically attractive due to the high cost of hydrogen. Consequently, such processes as vis-breaking and coking have been used. With the advent of catalytic cracking and reforming, relatively cheap $H_2$ has become available. This hydrogen, however, is often quite impure, containing up to 85% or more of light hydrocarbons. High purity hydrogen is desired for hydrogenation of reduced crudes for best results. This invention comprises an improved method of increasing the hydrogen purity.

In a U. S. Patent No. 2,526,524, patented October 17, 1950, on an application filed by Albert B. Welty, Jr. there is described and claimed a method of obtaining a hydrogen-containing gas of increased hydrogen content from a gas of low hydrogen content. In brief compass, this patent discloses and claims a method of enriching a gas containing hydrogen with respect to its hydrogen content by contacting a gas of low hydrogen content with an adsorbent material which may be, for example, molybdenum oxide carried on a suitable support, whereby the hydrogen is adsorbed, in a first step, on the molybdenum-alumina material, and desorbed in a second step with steam to yield a gas of increased hydrogen concentration.

The present invention is an improvement over that disclosed and claimed in the aforesaid Welty patent in that it has now been found that the capacity of a suitable material, such as that proposed by Welty can be at least doubled for hydrogen adsorption, and thus the capacity of a given hydrogen adsorption installation is increased by 100%. The adsorber material used in the present invention is one which contains carbon, e. g., the carbonaceous material which is formed on a catalyst containing molybdena carried on a gel carrier during use in a hydroforming operation, all of which will appear more fully in the ensuing more detailed description and claims.

The main object of the invention is to provide means for recovering hydrogen from a gaseous mixture containing the said hydrogen in low concentration to form a product of greater hydrogen concentration than that of the said low hydrogen concentration gaseous mixture.

An important object of the present invention is to separate hydrogen from a gaseous mixture containing the same in a continuous process utilizing a superior adsorbent for hydrogen.

Another object of the present invention is to recover or separate hydrogen from a hydrogen-containing gas utilizing a carbonized adsorbent for hydrogen in which the amount of carbon on the adsorbent is controlled in order to attain improved results.

A further object of the present invention is to provide suitable means for controlling the adsorptive capacity of the adsorbent material so that the latter will function at maximum efficiency.

Other and further objects of the present invention will appear from the following more detailed description, the claims and the appended drawing.

The present invention, in a preferred modification, comprises providing a system in which a powdered carbon-containing adsorbent in the form of dense fluidized masses in several zones, including an adsorption zone, a desorption zone and, if necessary, a zone in which excess carbon is removed from the adsorber, is utilized to carry out a continuous process for producing hydrogen of suitable purity for industrial uses at low cost.

In the accompanying drawing, there is indicated, diagrammatically, an integrated plant comprising a hydroformer and a hydrogen purifying means in which a preferred modification of the present invention may be carried into effect.

In the drawing similar reference characters refer to similar parts.

Referring in detail to the drawing, hydroforming catalyst containing "coke," i. e., carbonaceous deposits, is obtained for use as a hydrogen absorbent from a hydroformer 1 containing a bed of fluidized hydroforming catalyst C disposed between a gas distributor G and an upper dense phase level L. The hydroforming reaction is carried out under known conditions of temperature, pressure, naphtha and hydrogen feed rates and naphtha residence time in reactor 1. The crude product is withdrawn overhead from reactor 1 via line 2 and delivered to a product recovery system 3 where it is subjected to cooling, distillation and the like, according to conventional methods. A portion of the hydrogen-containing gas, which is separated from the hydroformed naphtha, is withdrawn from the product recovery system via line 4 and charged to a stripper-adsorber 5 to which carbon-containing catalyst is fed to the said stripper through an opening 6 in the wall thereof. The hydrogen-containing gas passes countercurrently upward against downflowing catalyst which contains adsorbed hydrocarbons with the result that hydrocarbon material is desorbed from the catalyst while the hydrogen is selectively adsorbed by the catalyst. The stripping gas depleted of hydrogen and the desorbed hydrocarbon material passes into the space in reactor 1 above L and passes from reactor 1 with the crude hydroformed product to the product recovery system 3.

The stripped catalyst is withdrawn from stripper 5 through line 7 and passed into steam stripper 8. It will be understood that the catalyst in line 7 is at a temperature of from about 900° to 950° F. The hydrogen-containing gas in line 4 may be heated after separation from the hydroformed naphtha to a temperature of 900°–1000° F. in means not shown by passage through a furnace (not shown).

Steam is charged to stripper 8 at a lower point thereof via line 9 and passed countercurrently upward against the downflowing catalyst where adsorbed hydrogen is stripped from the latter and removed overhead via line 10 with the stripping steam. This mixture is cooled sufficiently to condense the steam in condenser 11 and the cooled material is charged via line 12 to a separator 13 from which hydrogen is recovered overhead via line 14 and passed to a receiving drum 15.

Stripped catalyst is withdrawn from steam stripper 8 and it may be recycled to reactor 1 or passed to a catalyst regenerator (not shown).

In order more fully to describe the present invention, the following further disclosure is set forth containing directions as to conditions in the various parts of the system, giving best results:

CONDITIONS IN STRIPPER-ADSORBER 5

| | Range | Preferred |
|---|---|---|
| Composition of catalyst | Any known hydroforming catalyst. | 10% $MoO_3$ on 90% $Al_2O_3$ (wgt. percent). |
| Wt. percent carbon on catalyst | 1–5 | 1.5–2.5. |
| Temperature, °F | 500–1,000 | 700–900. |
| Pressure, p. s. i. g | 0–1,000 | 50–400. |
| Contact time, seconds | 30–2,000 | 60–600. |

CONDITIONS IN STRIPPER 8

| | Range | Preferred |
|---|---|---|
| Nature of stripping media | A condensible gas. | Steam. |
| Temperature, °F | 700–1,200 | 800–1,000. |
| Pressure, p. s. i. g | 0–1,000 | 50–400. |
| Contact time, seconds | 30–2,000 | 60–600. |
| Standard cubic feet of steam fed to stripper per hour per vol. of adsorbent so fed (V./V./Hr.) | 1–20 | 2–4. |

*Example*

In order to show the advantages of the present invention several runs were carried out using as an adsorbent, molybdena supported on a gel formed by coprecipitating molybdena from a water soluble salt and alumina from a water soluble aluminum salt by known procedure.

The adsorbent contained 8½ wt. percent of molybdena and 91.5% by weight of alumina.

A gas having the following composition was treated under the below conditions in four runs:

$H_2$ mol percent ------------------------------- 65
Hydrocarbons ------------------------------- 35

| Run No. | 1 | 2 | 3 | 4 |
|---|---|---|---|---|
| Temperature, °F | 900 | 900 | 900 | 900 |
| Pressure, p. s. i. g | 200 | 200 | 200 | 200 |
| Contact time, minutes | 30 | 30 | 30 | 30 |
| Wt. percent carbon on adsorbent based on total weight of $Al_2O_3+MoO_3$ | 0 | 0.5 | 1.0 | 1.5 |
| $H_2$ adsorbed in standard cubic feet per lb. of adsorbent | 0.22 | 0.29 | 0.37 | 0.44 |

It is to be noted with respect to the foregoing runs, that these were carried out under substantially the same conditions except that the catalyst-adsorbent material in the several runs contained different amounts of carbon; that an increase in the carbon content increased the amount of hydrogen adsorbed; and, that in the case where the carbon content of the adsorbent was 1.5 wt. percent, the hydrogen adsorbed was double that of the carbon-free adsorbent.

The present invention contemplates the use of any stripping gas for desorbing adsorbed hydrogen from the adsorbent material, preferably, one which is a condensible gas or vapor. In place of employing carbonized molybdenum oxide on alumina, which has been found to be capable of adsorbing 14–16 volumes of standard hydrogen per volume of adsorbent, other adsorbent materials may be used. Hence, the molybdenum oxide may be supported on such carbonized materials as acid treated bentonitic clay, pumice, Attapulgus clay, silica gel, silica-alumina gel and the like.

To recapitulate briefly, the present invention relates to a method of obtaining from a hydrogen-containing gas a quantity of hydrogen-containing gas having higher concentration of hydrogen than the first mentioned gas. This is accomplished by contacting the original hydrogen-containing gas with a solid carbonized adsorbent powdered material, which material contains up to 5 wt. percent carbon. The term "carbon" is herein used to specify carbonaceous material and to include not only pure carbon itself, but a material also containing hydrogen, such as the deposits formed during the hydroforming process on a hydroforming catalyst. A good way to obtain a carbonized adsorbent is to charge to vessel 1, a virgin naphtha, together with hydrogen and to carry out a hydroforming process under known conditions using a molybdenum oxide on alumina catalyst. This hydroforming operation will result in the formation of carbonaceous deposits on the hydroforming deposit. This carbonized material may be used as the hydrogen adsorbent material. If the adsorbent material contains more carbonaceous material than that amount which gives good results, the excess undesired amount of carbonaceous material may be removed by treating the carbonized material with an oxygen-containing gas in a regenerator (not shown).

There comes a time when the solid carbonaceous material may be fouled with excess carbonaceous material due to the fact that the feed to the adsorbent may have a very substantial amount of hydrocarbons, which undergo cracking at the temperatures employed, this being particularly true if there are substantial amounts of olefinic hydrocarbons in the feed gas to be adsorbed. If the carbon buildup on the adsorbent becomes excessive, it may be withdrawn therefrom and charged to a suitable vessel to remove such excess carbonaceous material by treating the adsorbent with air or other oxygen-containing gas. In the present description the heat necessary for the hydrogen adsorption process was supplied as the sensible heat of the hot catalyst withdrawn from a hydroformer. This combination of a hydroformer plant and a hydrogen adsorption system provides a good way to obtain high purity hydrogen at low cost from the excess hydrogen a hydroformer invariably produces. In the practice of the present invention about 25% of the hydrogen produced in the hydroformer is removed and recovered from the steam stripper. During this hydrogen removal, the hydrogen partial pressure of the hydroforming system is not seriously reduced. Furthermore, only about 1.5 weight parts of catalyst per weight part of hydroformer feed oil is diverted to the steam stripper to recover this amount of hydrogen having a purity of 95% or higher.

In the case where the hydrogen recovery plant is not part of a hydroformer-hydrogen gas enriching unit, the heat can be supplied by any convenient means such as employing a burner in which the adsorbent carrying or associated with a combustible material is treated with air or other oxygen-containing gas.

Numerous modifications of this invention will suggest themselves to those who are familiar with the art without departing from the spirit thereof.

What is claimed is:

1. A method of recovering hydrogen from a gaseous mixture containing hydrogen and normally gaseous hydrocarbons which comprises charging the gaseous mixture to an adsorption zone containing an adsorbent material comprising a hydroforming catalyst carbonized to the extent that it contains from about 1.0 to 5 wt. percent of carbonaceous material, permitting the gaseous material to contact the carbonized adsorbent at elevated temperatures for a sufficient period of time to permit the adsorbent material to adsorb hydrogen, withdrawing the adsorbent material containing said hydrogen, charging it to a stripping zone, contacting the adsorbent material in said stripping zone with a condensible gas to dislodge the hydrogen from the said adsorbent material and recovering from the stripping zone a gasiform mixture containing hydrogen in greater concentration than the gas fed to the adsorption zone.

2. The method of recovering hydrogen from a gaseous mixture containing hydrogen in low concentration and normally gaseous hydrocarbons which comprises charging the mixture to an adsorption zone containing an adsorbent material comprising molybdena carried on alumina and also containing 1.0 to 5 wt. percent of carbonaceous material, permitting the gaseous material to contact the said adsorbent material at elevated temperatures for a sufficient period of time to permit the adsorption by said adsorbent material of hydrogen, thereafter treating the adsorbent material with a condensible gas to desorb the said hydrogen, cooling the desorbed material sufficiently to condense the condensible gas associated therewith and recovering a hydrogen-containing gas of relatively high concentration.

3. The method set forth in claim 2 in which the condensible gas is steam.

4. The method set forth in claim 2 in which the adsorbent material contains from about 1.5 to 2.5 wt. percent carbonaceous material.

5. The method set forth in claim 2 in which the adsorbent material is obtained from a hydroforming zone at a temperature of from about 700°–900° F. and treated with the gaseous mixture of relatively low hydrogen concentration at the said temperature.

6. A continuous method for recovering hydrogen from a gaseous mixture consisting of hydrogen and normally gaseous hydrocarbons which comprises charging the said gaseous mixture to an adsorption zone containing a turbulent fluidized mass of solid particles consisting essentially of molybdenum oxide carried on activated alumina, which particles also carry from about 1.0 to 5 wt. percent carbonaceous material, permitting the hydrogen-containing gas to contact said solid particles in an adsorption zone at a temperature within the range of from about 500°–1000° F. and at a pressure of from about 0–1000 p. s. i. g. for a sufficient period of time to permit at least a portion of the hydrogen of the gaseous mixture to be adsorbed by the said solids, continuously withdrawing from the adsorption zone the solid particles containing adsorbed hydrogen, treating the withdrawn material in a hydrogen stripping zone with a condensible gas whereby the hydrogen is separated from the adsorbent, withdrawing a gaseous stream consisting of hydrogen and a condensible gas from the last-named zone, cooling the said stream to condense the condensible gas and recovering a hydrogen gas having a concentration greater than the said gaseous mixture.

7. The method set forth in claim 6 in which the condensible gas is steam.

8. The method set forth in claim 6 in which the adsorbent material is derived substantially uncooled from a hydroforming zone operating under hydroforming conditions.

9. The method of claim 8 in which the adsorption zone is at substantially the same pressure as the hydroforming zone.

References Cited in the file of this patent

UNITED STATES PATENTS

| | | |
|---|---|---|
| 2,498,559 | Layng | Feb. 21, 1950 |
| 2,526,524 | Welty | Oct. 17, 1950 |
| 2,633,207 | Etherington | Mar. 31, 1953 |